United States Patent
Tamai

(10) Patent No.: US 9,323,339 B2
(45) Date of Patent: Apr. 26, 2016

(54) INPUT DEVICE, INPUT METHOD AND RECORDING MEDIUM

(75) Inventor: Junichi Tamai, Osaka (JP)

(73) Assignee: NEC Solution Innovators, Ltd., Tokyo (JP)

( * ) Notice: Subject to any disclaimer, the term of this patent is extended or adjusted under 35 U.S.C. 154(b) by 38 days.

(21) Appl. No.: 14/112,147

(22) PCT Filed: Apr. 27, 2012

(86) PCT No.: PCT/JP2012/061469
§ 371 (c)(1),
(2), (4) Date: Oct. 16, 2013

(87) PCT Pub. No.: WO2012/147959
PCT Pub. Date: Nov. 1, 2012

(65) Prior Publication Data
US 2014/0035813 A1 Feb. 6, 2014

(30) Foreign Application Priority Data
Apr. 27, 2011 (JP) .................................. 2011-100216

(51) Int. Cl.
*G06F 3/01* (2006.01)
*G06F 3/00* (2006.01)
*G06F 3/03* (2006.01)
*G06F 3/0482* (2013.01)

(52) U.S. Cl.
CPC ................ *G06F 3/017* (2013.01); *G06F 3/005* (2013.01); *G06F 3/0304* (2013.01); *G06F 3/0482* (2013.01)

(58) Field of Classification Search
CPC ...................................................... G06F 3/017
USPC .......................................................... 345/156
See application file for complete search history.

(56) References Cited

U.S. PATENT DOCUMENTS

| 2009/0077504 | A1* | 3/2009 | Bell .................. G06F 3/011 715/863 |
| 2009/0228841 | A1 | 9/2009 | Hildreth |
| 2009/0262187 | A1* | 10/2009 | Asada et al. ................. 348/77 |

(Continued)

FOREIGN PATENT DOCUMENTS

| EP | 1 950 957 A2 | 7/2008 |
| EP | 2 040 156 A2 | 3/2009 |

(Continued)

OTHER PUBLICATIONS

Notification of Reasons for Rejection mailed on Jun. 17, 2014 by the Japanese Patent Office in counterpart Japanese Patent Application No. 2013-512492.

(Continued)

*Primary Examiner* — Amare Mengistu
*Assistant Examiner* — Joseph G Rodriguez
(74) *Attorney, Agent, or Firm* — Finnegan, Henderson, Farabow, Garrett & Dunner LLP

(57) ABSTRACT

An obtainer obtains information indicating a distance between a display and a user picked up by a camera. A display controller displays, in the display screen of the display, an operation screen having the size set in accordance with the information obtained by the obtainer. A determiner determines an operation instruction from the user based on at least one of the motion of the user and the shape picked up by the camera. An executor executes a process in accordance with the operation instruction determined by the determiner.

17 Claims, 10 Drawing Sheets

(56) References Cited

U.S. PATENT DOCUMENTS

| | | |
|---|---|---|
| 2009/0315740 A1 | 12/2009 | Hildreth et al. |
| 2010/0118055 A1 | 5/2010 | Nishibori |
| 2010/0251171 A1* | 9/2010 | Parulski ........................ 715/810 |
| 2011/0141009 A1 | 6/2011 | Izumi |

FOREIGN PATENT DOCUMENTS

| | | |
|---|---|---|
| JP | 08-123612 | 5/1996 |
| JP | 08-315154 | 11/1996 |
| JP | 2004-78977 | 3/2004 |
| JP | 2005-050177 | 2/2005 |
| JP | 2008-129775 | 6/2008 |
| JP | 2008-282131 | 11/2008 |
| JP | 2010-257093 | 11/2010 |
| JP | 2011-54118 | 3/2011 |
| KR | 10-2011-0008313 | 1/2011 |

OTHER PUBLICATIONS

Notification of Submission of Opinion mailed on Sep. 22, 2014 by the Korean Patent Office in counterpart Korean Patent Application No. 10-2013-7028074.

Extended European Search Report dated Oct. 15, 2014 issued by the European Patent Office in counterpart European Patent Application No. 12776042.9.

International Search Report mailed on Jun. 26, 2012.

Decision of Rejection mailed on Feb. 3, 2015 by the Japanese Patent Office in counterpart Japanese Patent Application No. 2013-512492.

* cited by examiner

FIG.4

COMMAND TABLE

| MOTION OF HAND | OPERATION COMMAND |
|---|---|
| QUICK HORIZONTAL MOTION OF HAND | OPERATION START |
| UPWARD MOTION OF HAND | VOLUME UP |
| DOWNWARD MOTION OF HAND | VOLUME DOWN |
| RIGHTWARD MOTION OF HAND | PLAY |
| LEFTWARD MOTION OF HAND | STOP |
| UPWARD OBLIQUE RIGHT MOTION OF HAND | FORWARD |
| UPWARD OBLIQUE LEFT MOTION OF HAND | REWIND |
| DOWNWARD OBLIQUE RIGHT MOTION OF HAND | SKIP |
| DOWNWARD OBLIQUE LEFT MOTION OF HAND | REPLAY |
| ⋮ | ⋮ |

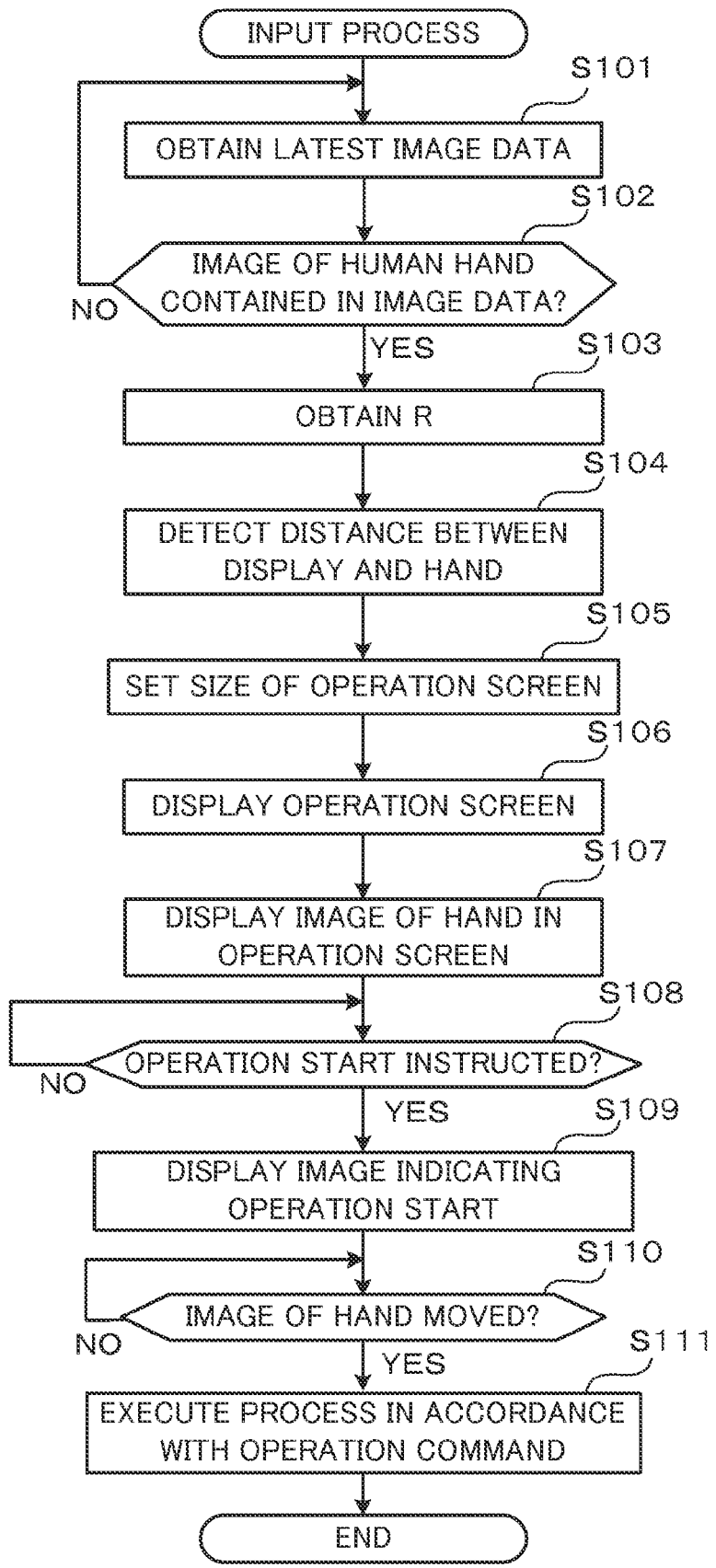

INPUT DEVICE, INPUT METHOD AND RECORDING MEDIUM

TECHNICAL FIELD

The present invention relates to an input device, an input method, and a recording medium.

BACKGROUND ART

A so-called hand-gesture device is known which determines an operation instruction from a user based on the motion of a hand of the user. For example, Patent Literature 1 discloses an input device which synthesizes a user image picked up by a camera in an operation screen displayed on a television, and which enables the user to select, for example, a menu item based on the motion of an object in the operation screen.

CITATION LIST

Patent Literature

Patent Literature 1: Unexamined Japanese Patent Application Kokai Publication No. 2010-257093

SUMMARY OF INVENTION

Technical Problem

In the case of the input device disclosed in Patent Literature 1, since the size of the operation screen always remains the same, when the user attempts to give an operation while being distant from the television, it is not easy for the user to view the operation screen, and thus it is difficult for the user to give an operation.

The present invention has been made in view of the above-explained circumstance, and it is an objective of the present invention to provide an input device, an input method and a recording medium which facilitate an operation when the operation is given in a manner distant from a screen.

Solution to Problem

An input device according to a first aspect of the present invention includes: an obtainer that obtains information indicating a distance between a display or a camera and an object picked up by the camera; a display controller that displays, in a display screen of the display, an operation screen with a size set in accordance with the information obtained by the obtainer; and a determiner that determines an operation instruction from the object based on at least one of a motion of the object and a shape thereof picked up by the camera.

An input method according to a second aspect of the present invention includes: an obtaining step for obtaining information indicating a distance between a display or a camera and an object picked up by the camera; a display controlling step for displaying, in a display screen of the display, an operation screen with a size set in accordance with the information obtained through the obtaining step; and a determining step for determining an operation instruction from the object based on at least one of a motion of the object and a shape thereof picked up by the camera.

A program according to a third aspect of the present invention allows a computer to function as: an obtainer that obtains information indicating a distance between a display or a camera and an object picked up by the camera; a display controller that displays, in a display screen of the display, an operation screen with a size set in accordance with the information obtained by the obtainer; and a determiner that determines an operation instruction from the object based on at least one of a motion of the object and a shape thereof picked up by the camera.

Advantageous Effects of Invention

According to the present invention, an operation can be given easily even if the operation is given in a manner distant from a screen.

BRIEF DESCRIPTION OF DRAWINGS

FIG. 4 is a diagram illustrating an example command table having a motion of a hand of a user associated with an operation command;

FIG. 7 is a flowchart for explaining an input process according to an embodiment;

DESCRIPTION OF EMBODIMENTS

An explanation will now be given of an input device 100 according to an embodiment with reference to the accompanying drawings.

Figure 1:
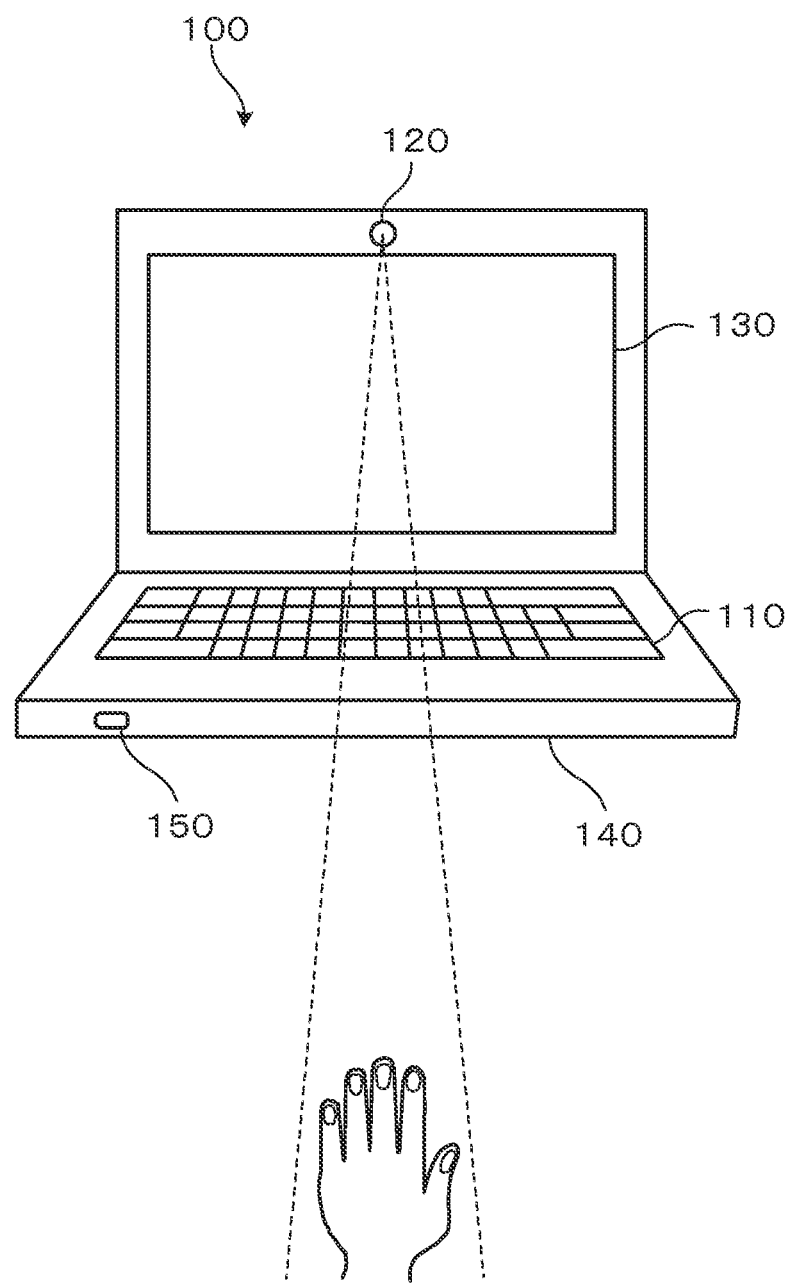
FIG. 1 is a perspective view illustrating an input device according to an embodiment of the present invention.

The input device 100 has a function of determining an operation instruction from a user based on the motion of a hand of the user. An example input device 100 is a personal computer. FIG. 1 illustrates an external view of the input device 100. As illustrated in FIG. 1, the input device 100 includes an operating device 110, a camera 120, a display 130, a main body 140, and a sound outputter 150.

The operating device 110 includes input devices like a keyboard. The operating device 110 accepts an operation input like a process starting instruction from the user, and outputs the accepted instruction to the main body 140.

The camera 120 includes, for example, a camera with a CCD (Charge Coupled Device) image sensor or a camera with a CMOS (Complementary Metal Oxide Semiconductor). The camera 120 is disposed at the upper center of the display 130. The camera 120 is disposed in such a manner as to pick up images in the facing direction with the display 130.

Hence, the camera 120 picks up images of the user who operates the input device 100 and is viewing the display 130.

The display 130 includes a display device like a liquid crystal display. The display 130 displays various images in the display screen of the display device. Various images displayed by the display 130 include an operation screen. The "operation screen" is images and the like that will be a user interface for operating the input device 100 in the display screen. For example, the operation screen is a window displaying a user himself/herself picked up by the camera 120 or menu items and the like.

The main body 140 is the main unit of the input device 100. The main body 140 executes various processes in accordance with an operation input like a process starting instruction from the user.

The sound outputter 150 includes a speaker and the like. The sound outputter 150 outputs sounds and the like in accordance with a process executed by the main body 140.

Figure 2:
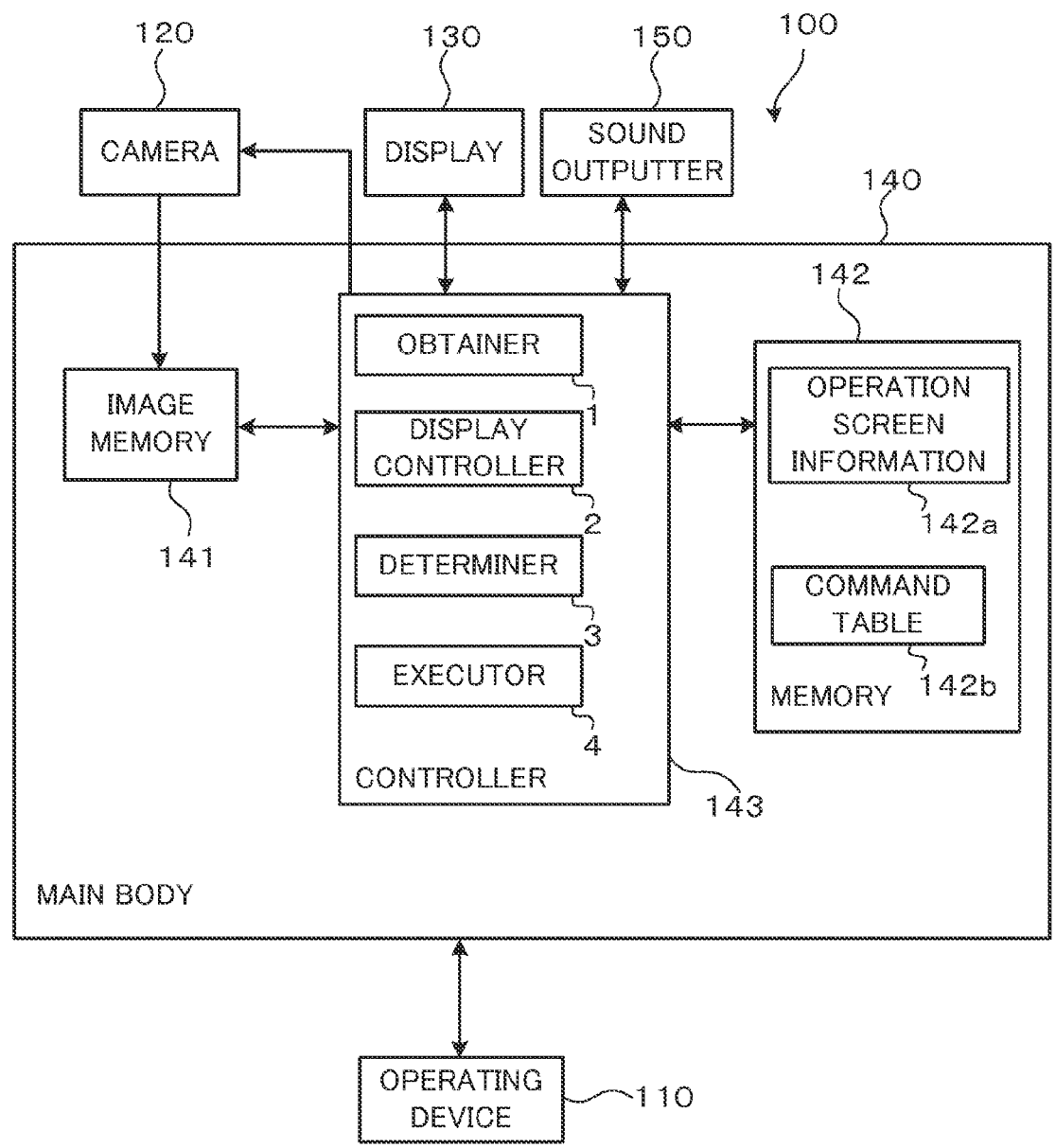
FIG. 2 is a functional block diagram of the input device illustrated in FIG. 1.

Next, an explanation will be given of the functional structure of the main body 140 with reference to FIG. 2. As illustrated in FIG. 2, the main body 140 includes an image memory 141, a memory 142, and a controller 143.

The image memory 141 includes, for example, a video memory like a RAM (Random Access Memory), and stores image data output by the camera 120. The image data includes, for example, image data corresponding to the image of the user or the like picked up by the camera 120.

The memory 142 includes a memory device like a RAM and a hard disk. The memory 142 stores various data like operation screen information 142a and a command table 142b, and the like.

Figure 3A:
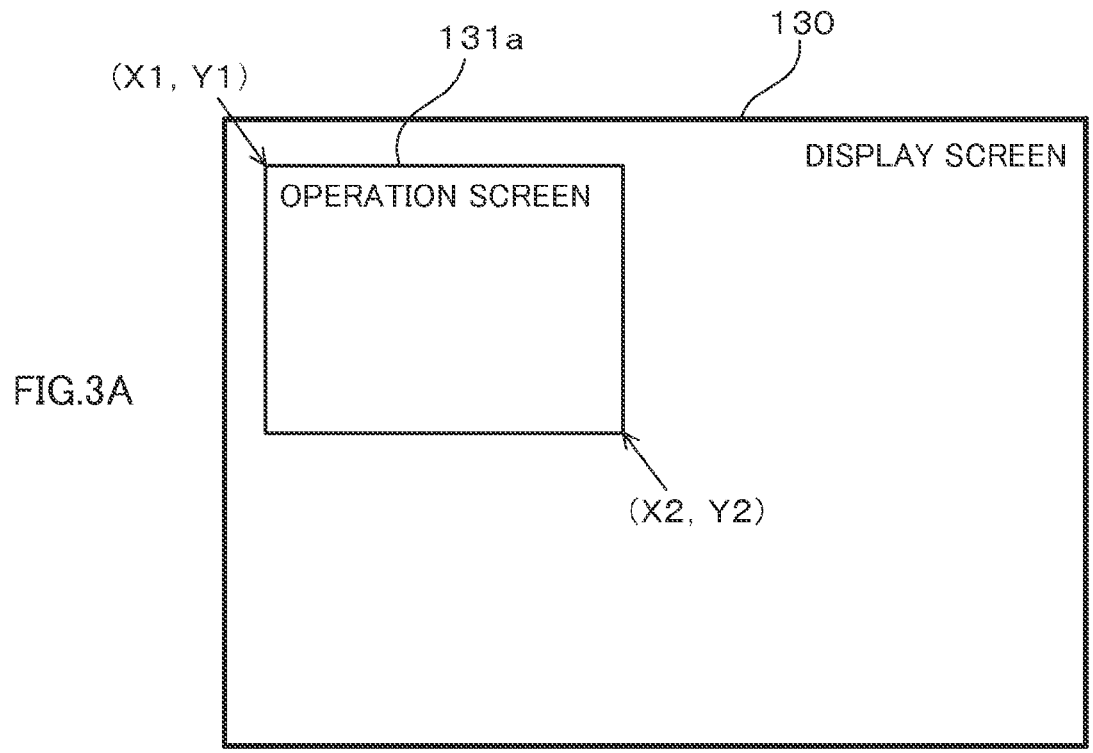
FIG. 3A is a diagram illustrating how a small operation screen is displayed in a display screen.
Figure 3B:
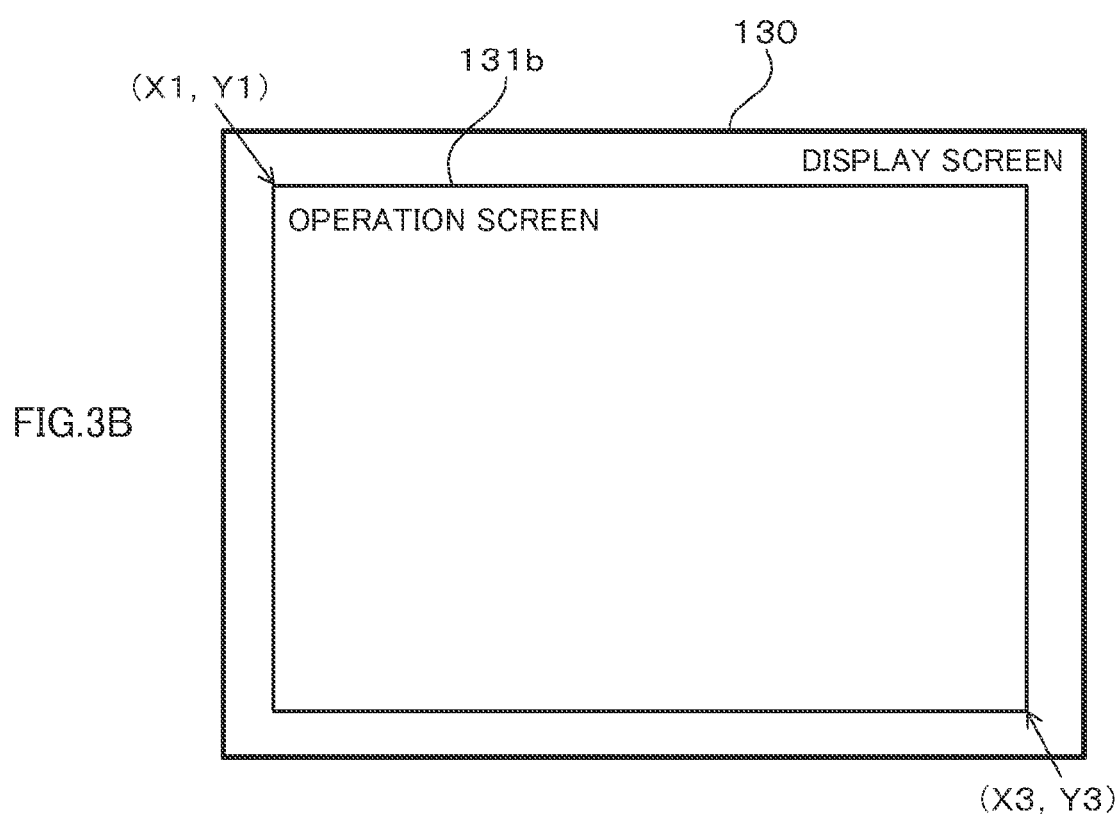
FIG. 3B is a diagram illustrating how a large operation screen is displayed in a display screen.

The operation screen information 142a is, for example, information on the position of the operation screen and the size thereof. FIG. 3A illustrates, as an operation screen 131, an operation screen 131a set in a rectangular area occupying substantially 20% of the display screen. In this case, the operation screen information 142a on the operation screen 131a is, for example, coordinates (X1, Y1) of a vertex of the rectangular, and coordinates (X2, Y2) of a vertex on the diagonal line from the former vertex of the rectangular. The position of the operation screen and the size thereof can be set based on the coordinates (X1, Y1) and the coordinates (X2, Y2). FIG. 3B illustrates, as the operation screen 131, an operation screen 131b set in a rectangular area occupying substantially 80% of the display screen. In this case, the operation screen information 142a on the operation screen 131b is, for example, coordinates (X1, Y1) of a vertex of the rectangular, and coordinates (X3, Y3) of a vertex on the diagonal line from the former vertex of the rectangular. The operation screen information 142a is not limited to the coordinates of vertices, but may be coordinates of a weight center of an area set as the operation screen and a distance between the weight center and an end of the area.

As illustrated in FIG. 4, the command table 142b includes information having "a motion of a hand" of the user and an "operation command" associated with each other. The "operation command" is information output to an operating system or an application software like a music player software or the like through an interface between softwares (hereinafter, referred to as a "software interface"). The operation command is, for example, information on an operation given to the operating system, and information on an operation given to the music player software or the like, such as play, stop, forward, and skip.

In FIG. 4, an operation command is associated with a motion of a hand. For example, as information on an operation to the operating system, "operation start" is associated with "quick horizontal motion of a hand". Moreover, as information on an operation to the music player software, "volume up" is associated with "upward motion of a hand". Furthermore, "play" is associated with "rightward motion of a hand".

The controller 143 includes a processor and the like, operates in accordance with a program stored in the memory 142, and executes various processes in accordance with an operation input like a process starting instruction from the user. When the operating device 110 outputs a process starting instruction, the controller 143 instructs the camera 120 to start image pickup. Upon this instruction, the camera 120 sequentially outputs picked-up images to the image memory 141. The controller 143 controls the display 130 to display various images.

Moreover, when the operating device 110 outputs a process starting instruction, the controller 143 executes an application software like a music player software, and starts an input process for inputting an operation command to the application software through the software interface.

The controller 143 serves as an obtainer 1, a display controller 2, a determiner 3, and an executer 4. The obtainer 1 obtains information on a distance between the display 130 (display device) or the camera 120 and the user (object) picked up by the camera 120. The camera 120 is disposed at the upper center of the display 130, and thus it can be thought that the distance between the display 130 and the user and the distance between the camera 120 and the user are substantially same. Hence, it is deemed that the obtainer 1 obtains information on the distance between the display 130 and the user. For example, as the information on the distance from the user, the obtainer 1 obtains a ratio R of an area of an image of a hand relative to the area of the whole image corresponding to image data. The distance between the display 130 and the hand of the user picked up by the camera 120 is proportional to the ratio R of the area of the image of the hand relative to the area of the whole image corresponding to the image data. That is, the larger the ratio R of the area of the image of the hand relative to the area of the whole image corresponding to the image data is, the shorter the distance between the display 130 and the hand of the user is.

The display controller 2 displays the operation screen 131 having the size set based on the ratio R obtained by the obtainer 1 on the display 130. For example, in setting of the size of the operation screen 131, the display controller 2 detects the distance between the display 130 and the user based on the ratio R obtained by the obtainer 1. When, for example, the ratio R of the area of the image of the hand relative to the area of the whole image corresponding to image data is 5%, the display controller 2 detects the distance between the display 130 and the hand which is 3 m. Moreover, when the ratio R of the area of the image of the hand relative to the area of the whole image corresponding to the image data is 10%, the display controller 2 obtains the distance between the display 130 and the hand which is 1 m.

The display controller 2 increases the operation screen 131 as the distance indicated by the ratio R obtained by the obtainer 1 becomes large. When, for example, the detected distance is smaller than a predetermined threshold, the display controller 2 sets the small operation screen 131a. Conversely, when the detected distance is larger than the predetermined threshold, the display controller 2 sets the large operation screen 131b. Data corresponding to the operation screen 131 set by the display controller 2 is output to the display 130, and is displayed in the display screen of the display device.

Figure 5A:
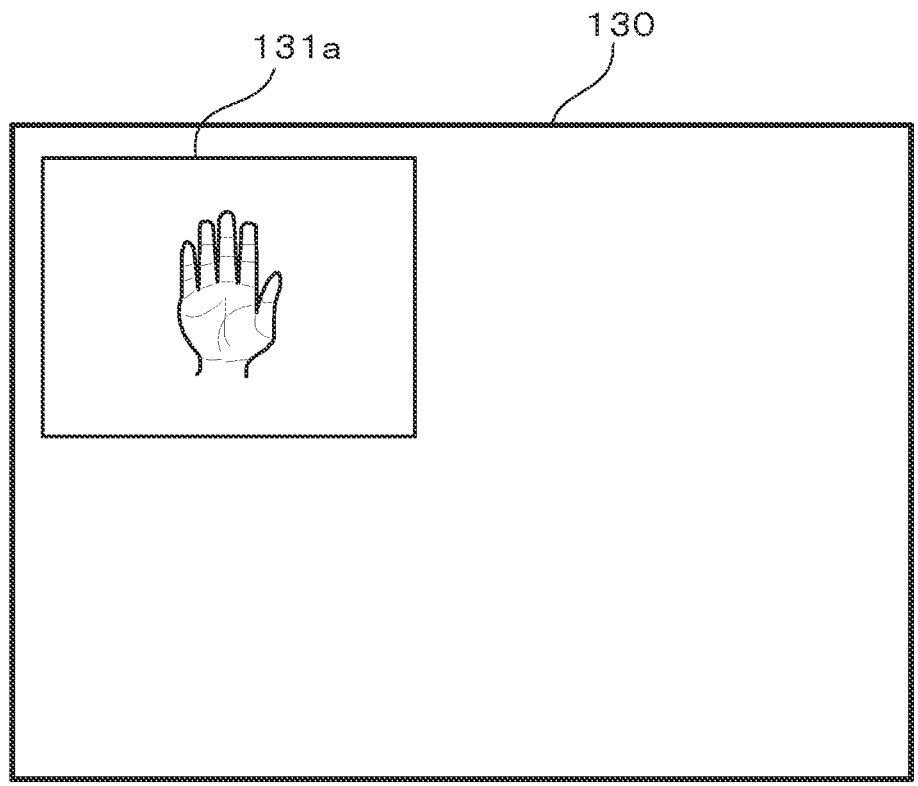
FIG. 5A is a diagram illustrating how an image of a hand picked up at a close range is displayed.
Figure 5B:
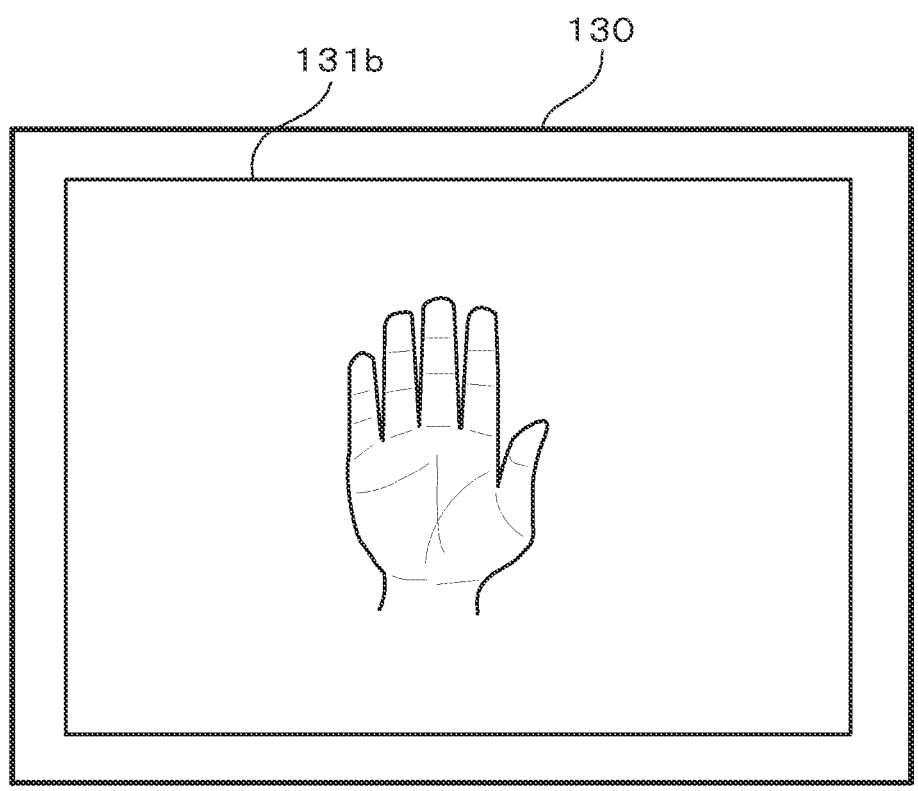
FIG. 5B is a diagram illustrating how an image of a hand picked up at a long range is displayed.

The display controller 2 obtains image data to be displayed in the operation screen 131 as latest image data from the image memory 141. The display controller 2 processes the image data obtained in accordance with the size of the operation screen 131, and sets the operation screen. For example, as image data of a hand, image data corresponding to an image within a range where a predetermined width is added to each of the four sides of the minimum rectangle surrounding the hand is cut out from the obtained image data. The cut-out image data is enlarged or scaled-down in accordance with the size of the operation screen 131, and sets as an image to be displayed in the operation screen 131 by the display controller 2. Hence, when the operation screen 131a is set as the operation screen 131, as illustrated in FIG. 5A, the image of a hand is displayed in the operation screen 131a. Moreover, when the operation screen 131b is set as the operation screen 131, as illustrated in FIG. 5B, the image of the hand is displayed in the operation screen 131b.

The display controller 2 updates the operation screen 131 as needed. For example, the display controller 2 changes the operation screen 131 in accordance with the gesture of the user (at least one of the motion and the shape) picked up by the camera 120. The display controller 2 cuts out image data of the hand as needed from the image data, and outputs image data corresponding to the set image to the display 130, thereby changing the operation screen 131.

The determiner 3 determines an operation instruction from the user based on the gesture of the user picked up by the camera 120. First, the determiner 3 determines whether or not an image of a human hand is included in the image data. For example, the memory 142 stores in advance pattern data extracting the feature of the image of a human hand. The determiner 3 checks the image data with that pattern data, thereby determining whether or not an image of a human hand is included in the image data.

Next, the determiner 3 determines whether or not the gesture of the user picked up by the camera 120 matches the gesture associated with an operation instruction. For example, the determiner 3 determines whether or not, as the gesture of the user, the gesture of the hand of the user picked up by the camera 120 matches the gesture associated with an operation instruction. The determiner 3 recognizes, for example, the motion of the image of the hand in order to determine the gesture of the hand. In this case, as the weight center of the hand in the image data, the determiner 3 calculates an average of the positional coordinates of all pixels corresponding to the image of the hand in the image data as needed. When this weight center moves over a predetermined width in the horizontal direction within a certain time, the determiner 3 determines that the hand quickly moves in the horizontal direction. The operation instruction from the object is determined based on the motion of the hand of the object picked up by the camera.

Figure 6A:
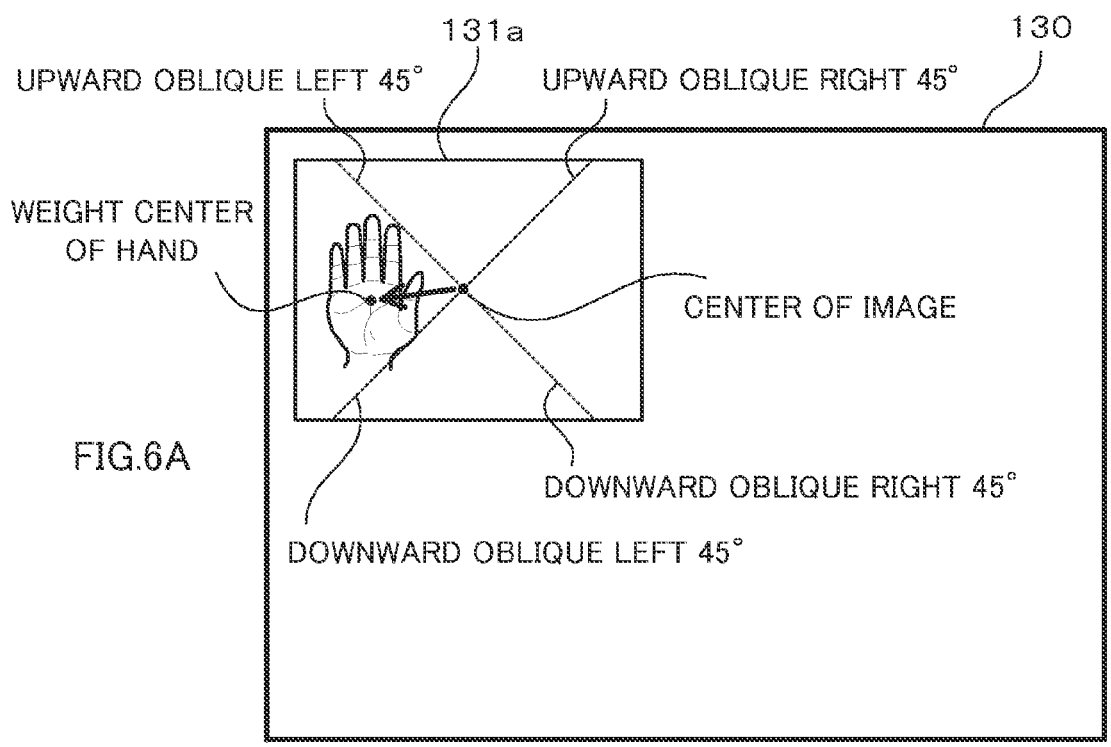
FIG. 6A is a diagram illustrating a motion of a hand displayed in a small operation screen.
Figure 6B:
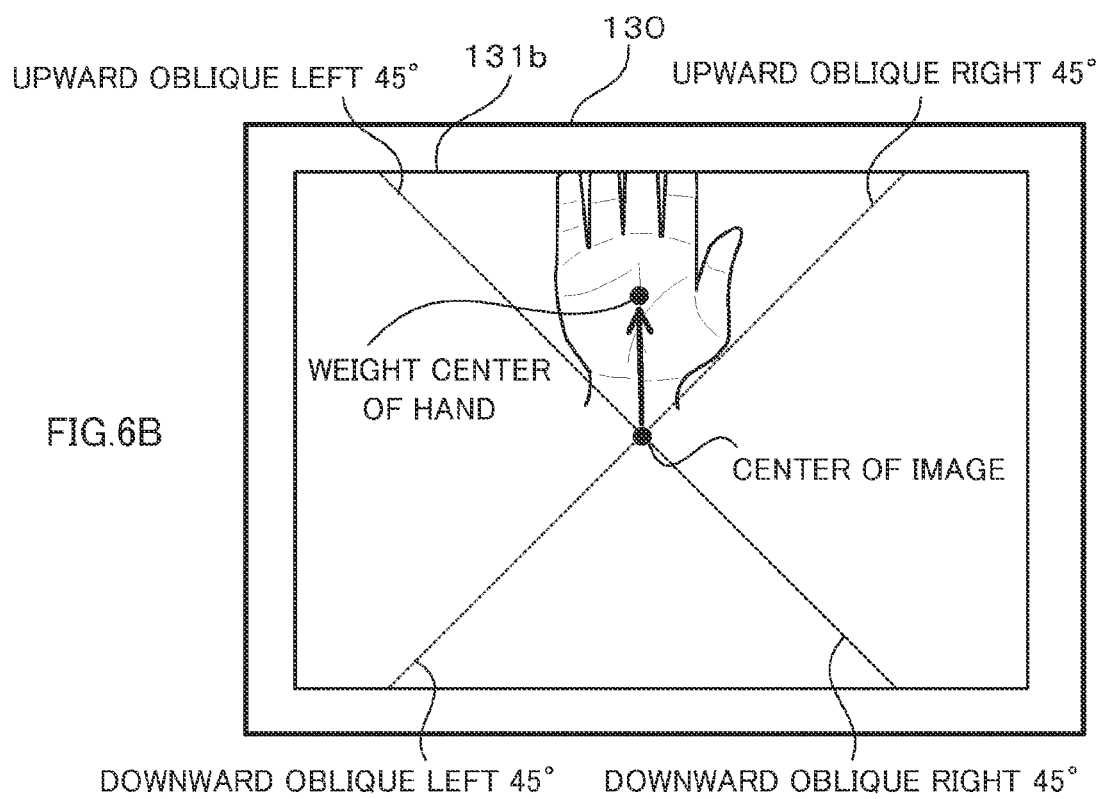
FIG. 6B is a diagram illustrating a motion of a hand displayed in a large operation screen.

Moreover, the determiner 3 may be configured to calculate a distance between the weight center of the hand and the center of the image that is an average of the positional coordinates of all pixels in the image data to recognize the motion of the image of the hand of the user as needed. When, for example, the calculated distance becomes equal to or larger than a predetermined threshold, the determiner 3 recognizes that the hand of the user moves. At this time, as illustrated in FIG. 6A, when a straight line interconnecting the weight center of the hand with the center of the image is within a range from downward oblique left 45 degrees to upward oblique left 45 degrees, the determiner 3 recognizes that the hand moves to the left. Moreover, as illustrated in FIG. 6B, when the straight line interconnecting the weight center of the hand with the center of the image is within a range from upward oblique left 45 degrees to upward oblique right 45 degrees, the determiner 3 determines that the hand moves upwardly. Likewise, when the straight line interconnecting the weight center of the hand with the center of the image is within a range from upward oblique right 45 degrees to downward oblique right 45 degrees, the determiner 3 determines that the hand moves to the right. When the straight line interconnecting the weight center of the hand with the center of the image is within a range from downward oblique right 45 degrees to downward oblique left 45 degrees, the determiner 3 recognizes that the hand moves downwardly.

When the motion of the hand of the user is recognized in this manner, the determiner 3 looks up the command table 142b, and determines an operation command corresponding to the recognized motion of the hand as an operation instruction from the user. When, for example, recognizing that the hand quickly moves horizontally, the determiner 3 determines an operation command "operation start" associated with "quick horizontal motion of hand" as an operation instruction from the user. Moreover, when recognizing that the hand moves to the right, the determiner 3 determines an operation command "play" associated with "motion of hand to right" as an operation instruction from the user. Furthermore, when recognizing that the hand moves upwardly, the determiner 3 determines an operation command "volume up" associated with "upward motion of hand" as an operation instruction from the user.

When having determined an operation instruction from the user, the controller 143 displays, for example, an illustration or a message on the display 130 as information indicating that an operation instruction is accepted from the user.

The executor 4 executes a process in accordance with an operation instruction determined by the determiner 3. The executor 4 outputs an operation command to the application software like a music player software through the software interface. When, for example, the operation command is "play", the executor 4 plays predetermined sound data or the like through the application software like the music player software. Accordingly, the sound outputter 150 outputs sounds corresponding to the sound data. Moreover, when the operation command is "volume up", the executor 4 increases the volume through the application software like the music player software. Hence, the sound outputter 150 increases the volume of the output sounds.

Next, an explanation will be given of an operation of the input device 100. An input process will be explained below with reference to the flowchart of FIG. 7.

The controller 143 obtains latest image data from the image memory 141 (step S101).

The determiner 3 determines whether or not the image data contains an image of a human hand (step S102). When no image of a human hand is contained in the image data (step S102: NO), the controller 143 returns the process to the step S101.

When an image of a human hand is contained in the image data (step S102: YES), the obtainer 1 obtains the ratio R of the area of the image of the hand relative to the area of the whole image corresponding to the image data (step S103). Next, the display controller 2 detects a distance between the display 130 and the picked-up hand based on the ratio R of the area of the image of the hand relative to the area of the whole image corresponding to the image data obtained by the obtainer 1 (step S104).

Next, the display controller 2 sets the size of the operation screen based on the detected distance (step S105). The display controller 2 displays the operation screen 131 having the size set on the display 130 through the display 130 (step S106).

The display controller 2 obtains latest image data from the image memory 141, and as illustrated in FIG. 5, displays an image of a hand corresponding to the obtained image data in the operation screen 131 (step S107).

Next, the determiner 3 recognizes the gesture of the user, and determines whether or not an operation start is instructed (step S108).

The controller 143 stands by until an operation start is instructed (step S108: NO). When the operation start is instructed (step S108: YES), the controller 143 displays, as information indicating that the operation start instruction is accepted from the user, an image indicating the operation start like an illustration or a message through the display 130 (step S109).

The determiner 3 stands by until an image of the hand corresponding to the image data moves (step S110: NO). When the image of the hand moves (step S110: YES), the determiner 3 executes a process in accordance with an operation command associated with the direction in which the recognized image of the hand has moved (step S111).

According to this embodiment, when the user is in a position apart from the input device 100, the input device 100 displays the large operation screen 131b on the display 130, and thus the user is capable of surely checking the motion of the user himself/herself from an apart position. Hence, the user is capable of easily operating the application software or the like while checking the motion of the user himself/herself.

Moreover, when the user is in a position near the input device 100, the input device 100 displays the small operation screen 131a on the display 130, and thus the user is capable of efficiently utilizing the screen while giving an operation to the application software or the like without being disturbed by the operation screen 131.

Figure 8A:
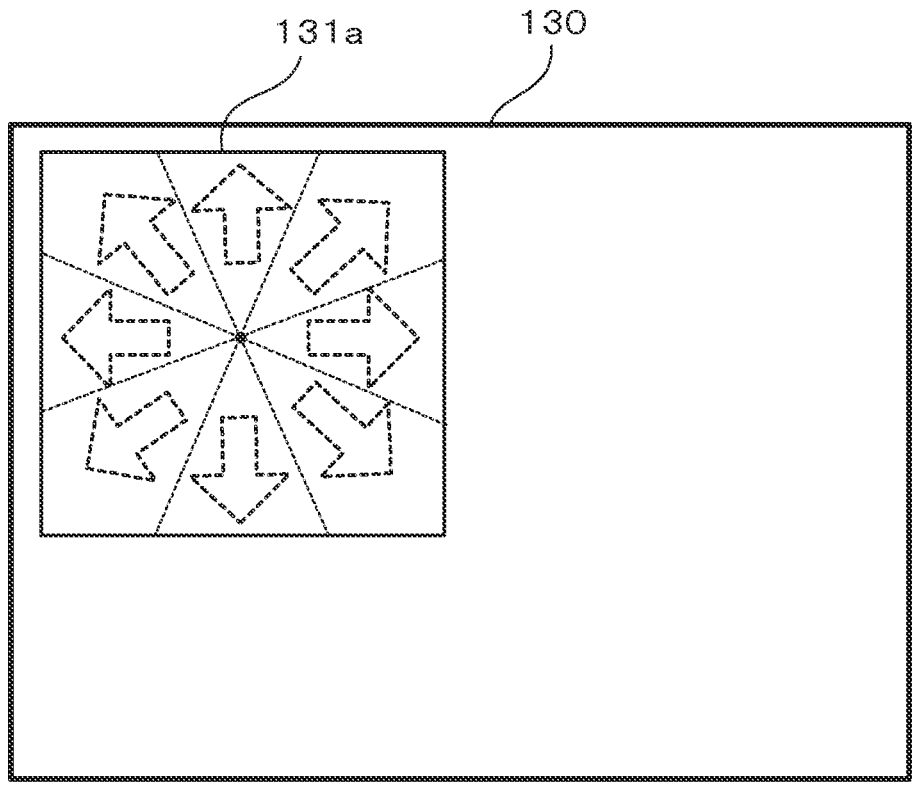
FIG. 8A is a diagram illustrating recognizable directions when a distance between a hand and a camera is short.
Figure 8B:
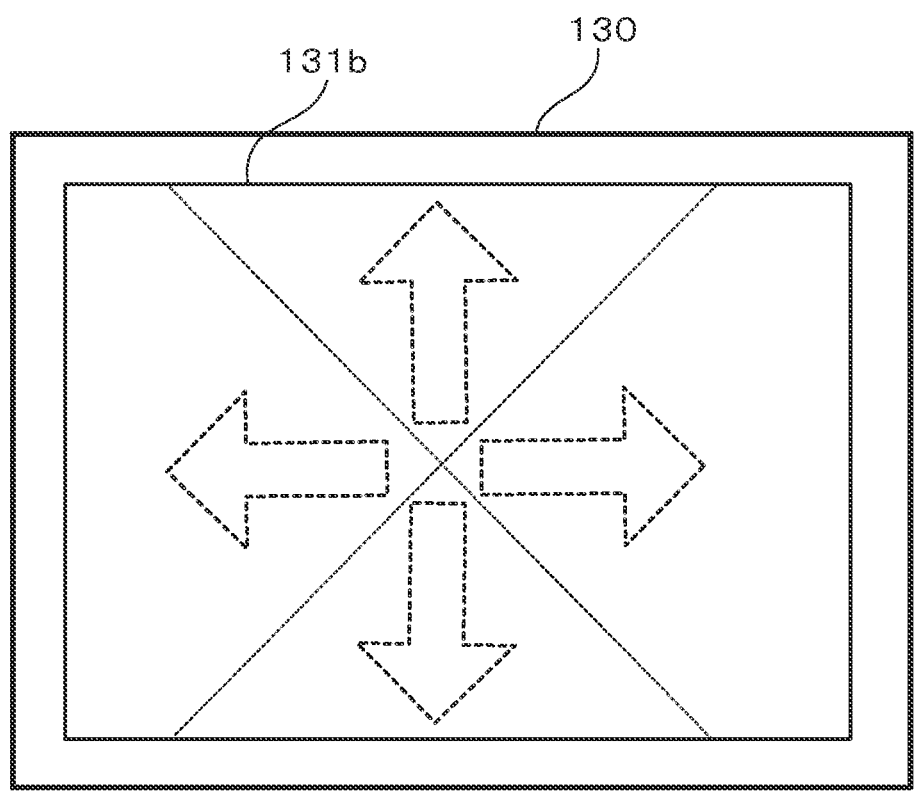
FIG. 8B is a diagram illustrating recognizable directions when a distance between a hand and a camera is long.

The determiner 3 may determine multiple operation instructions based on a difference in the gesture of the user picked up by the camera 120. At this time, the determiner 3 may determine a larger number of the operation instructions as the distance detected by the display controller 2 becomes shorter. When, for example, the distance detected by the display controller 2 is shorter than a predetermined threshold, as illustrated in FIG. 8A, the determiner 3 divides the operation screen 131a into eight pieces in a radial manner from the center of the image, and recognizes the motion of the hand in eight directions that are vertical and horizontal directions and oblique directions. Conversely, when the distance detected by the display controller 2 is longer than the predetermined threshold, as illustrated in FIG. 8B, the determiner 3 recognizes the motion of the hand in four directions that are vertical and horizontal directions. Accordingly, when the hand is located near the camera 120 and it is possible for the camera 120 to capture a fine motion, operation commands associated with a larger number of motions are determinable. This enables inputting of a larger number of operations. Moreover, when the hand is apart from the camera 120 and it is difficult for the camera 120 to capture a fine motion, operation commands associated with a fewer number of motions may be determined. This narrows down the target motion of the hand to be recognized, and thus a false operation input can be reduced.

Moreover, according to this embodiment, the display controller 2 displays the image of the user picked up by the camera 120 in the operation screen 131. This makes it possible for the input device 100 to feed back the motion of the user himself/herself to the user, and the user becomes able to input an operation while checking the motion of the user himself/herself. The image displayed in the operation screen 131 is not limited to the image picked up by the camera 120.

Figure 9:
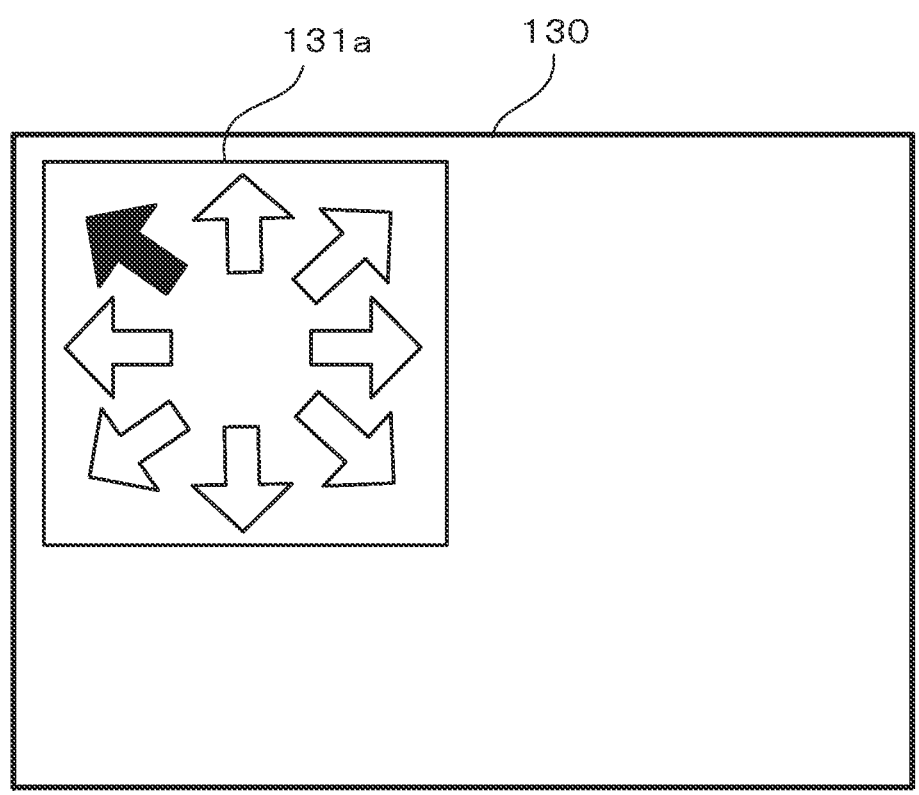
FIG. 9 is a diagram illustrating how a graphic changes in synchronization with the motion of a hand.
Figure 10:
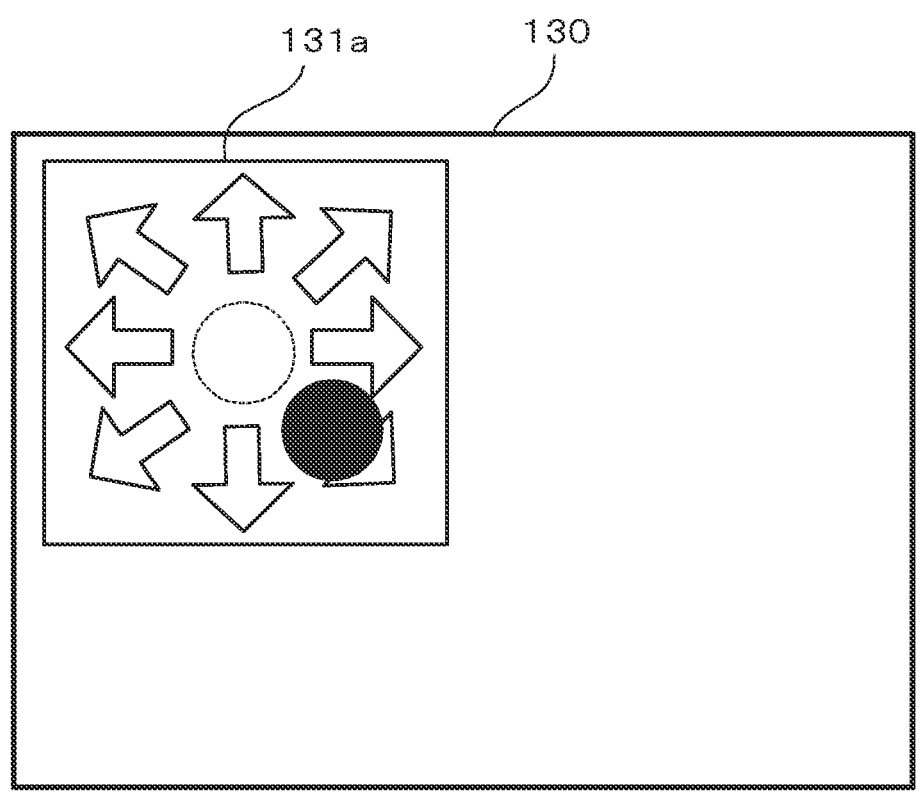
FIG. 10 is a diagram illustrating how a graphic moves in synchronization with the motion of a hand.

The display controller 2 may display a figure in the operation screen 131, and may change the shape of the figure in synchronization with the motion of the hand of the user picked up by the camera 120. For example, as illustrated in FIG. 9, the display controller 2 may display eight kinds of arrows corresponding to the moving directions of the image of the hand in the operation screen 131a. In this case, when, for example, the hand of the user moves to the upward oblique left, the color or tone of the upward oblique left arrow may be changed. Moreover, for example, as illustrated in FIG. 10, the display controller 2 may display a black dot instead of the hand of the user in the operation screen 131a. In this case, when, for example, the hand of the user moves to the downward oblique right, the black dot may be moved to the downward oblique right. In addition, the black dot may be changed to be a triangle or a rectangle in accordance with the motion of the hand to feed back the motion of the user himself/herself to the user. This allows the user to capture the motion of the user himself/herself in accordance with a motion of a simplified figure, which increases the visibility.

Moreover, according to this embodiment, the determiner 3 determines an operation instruction from the user based on the motion of a hand of the user picked up by the camera 120. The present invention is not limited to this case, and the determiner 3 may determine an operation instruction from the user based on a shape of a hand of the user.

For example, the memory 142 stores pattern data of a shape of an opened hand, pattern data of a shape of a grasped hand, and pattern data of a shape of a hand with only an index finger and a middle finger raised, and the determiner 3 recognizes the shape of a hand in image data based on those pieces of pattern data. Next, the determiner 3 determines, based on the recognized shape of the hand, a "play" command when the hand is in an opened shape, a "stop" command when the hand is in a grasped shape, and a "skip" command when the hand is in a shape with only the index finger and the middle finger raised, as an operation instruction. This allows an inputting of an operation based on the shape of the hand, and thus the variations of an operation input increase.

The determiner 3 may determine, as a gesture, whether or not a motion of a portion other than the hand of the user matches a gesture associated with an operation instruction. For example, the determiner 3 may determine whether or not the number of blinking of the user within a certain time matches a gesture associated with an operation instruction, and may determine whether or not a motion of a body matches a gesture associated with an operation instruction. Example motions of the body are standing, sitting and putting a hand up.

Moreover, the display controller 2 detects a distance between the display 130 and the user based on the ratio R of the area of the image of the hand relative to the area of the whole image corresponding to image data obtained by the obtainer 1, but the display controller 2 may detect the distance through other techniques. For example, the obtainer 1 recognizes the face of the user in image data, and obtains a distance between eyes (hereinafter, referred to as "inter-eye distance") from the recognized face. At this time, the display controller 2 may detect the distance between the display 130 and the user based on the inter-eye distance obtained by the obtainer 1. Moreover, when a sensor for measuring a distance like an infrared sensor or an ultrasound sensor is attached to the display 130 and the obtainer 1 obtains a measured value by the sensor for measuring the distance, the display controller 2 may detect the distance between the display 130 and the user based on the measured value by the distance measuring sensor. Furthermore, the input device 100 may include two cameras, and the display controller 2 may detect the distance between the display 130 and the user through, for example, a trigonometric technique based on a difference in images of the two cameras obtained by the obtainer 1.

The size of the operation screen 131 retained in the operation screen information 142a is not limited to two kinds: the small operation screen 131a; and the large operation screen 131b, and for example, equal to or greater than three operation screens 131 with different sizes may be stored. Moreover, the display controller 2 may detect the distance between the display 130 and the user as needed, and enlarge or scale down the operation screen 131 in accordance with the detected distance by, for example, converting the detected distance into the vertical length of the operation screen 131 or the horizontal length thereof.

The input device 100 of this embodiment may be realized by an exclusive system or may be realized by a normal computer system. For example, a program for executing the above-explained operations stored in a computer-readable recording medium is distributed, and installed in a computer, thereby configuring the input device 100 which executes the above-explained processes. Moreover, such a program may be stored in a disk device of a server device over a network like the Internet, and for example, downloaded to a computer. The above-explained functions may be realized by a cooperative work of an OS (operating system) and an application software. In this case, only portions other than the OS may be stored in a medium for distribution, and may be, for example, downloaded to a computer.

Example recording medium applicable for recording the above-explained program are a USB memory, a flexible disk, a CD, a DVD, a Blu-ray Disc (registered trademark), an MO, an SD card, a memory stick (registered trademark), and other computer-readable recording medium, such as a magnetic disk, an optical disk, a magneto-optical disk, a semiconductor memory, or a magnetic tape. Moreover, a recording medium that is usually stationary in a system or a device is also applicable like a hard disk or an SSD (solid state drive).

The present invention permits various embodiments and modifications without departing from the broadest scope and spirit of the present invention. The above-explained embodiment is to explain the present invention, and is not to limit the scope and spirit of the present invention. That is, the scope and spirit of the present invention are defined by the appended claims rather than the above-explained embodiment. Various modifications within the claims and equivalent range thereto of the present invention are also within the scope and spirit of the present invention.

A part of or all of the above-explained embodiment can be described as following additional notes, but the present invention is not limited to the following additional notes.

(Additional Note 1)
An input device including:
an obtainer that obtains information indicating a distance between a display or a camera and an object picked up by the camera;
a display controller that displays, in a display screen of the display, an operation screen with a size set in accordance with the information obtained by the obtainer; and
a determiner that determines an operation instruction from the object based on at least one of a motion of the object and a shape thereof picked up by the camera.

(Additional Note 2)
The input device recited in Additional Note 1, in which the display controller changes the operation screen in accordance with at least one of a motion of the object and a shape thereof picked up by the camera.

(Additional Note 3)
The input device recited in Additional Note 1 or 2, in which the display controller increases the operation screen as the distance indicated by the information obtained by the obtainer increases.

(Additional Note 4)
The input device recited in any one of Additional Notes 1 to 3, in which the determiner determines a plurality of operation instructions based on a difference in at least one of a motion of the object and a shape thereof picked up by the camera; and
determines a larger number of operation instructions as the distance indicated by the information obtained by the obtainer becomes short.

(Additional Note 5)
The input device recited in any one of Additional Notes 1 to 4, in which the display controller:
displays a figure in the operation screen; and
changes the figure in synchronization with a motion of the object picked up by the camera.

(Additional Note 6)
The input device recited in any one of Additional Notes 1 to 5, in which:
the display controller detects a distance between the display or the camera and a hand of the object picked up by the camera; and
the determiner determines the operation instruction from the object based on a motion of the hand of the object picked up by the camera.

(Additional Note 7)
The input device recited in Additional Note 6, in which the determiner determines the operation instruction from the object based on a shape of the hand of the object picked up by the camera.

(Additional Note 8)
An input method including:
an obtaining step for obtaining information indicating a distance between a display or a camera and an object picked up by the camera;
a display controlling step for displaying, in a display screen of the display, an operation screen with a size set in accordance with the information obtained through the obtaining step; and
a determining step for determining an operation instruction from the object based on at least one of a motion of the object and a shape thereof picked up by the camera.

(Additional Note 9)
A recording medium storing a program therein that allows a computer to function as:
an obtainer that obtains information indicating a distance between a display or a camera and an object picked up by the camera;
a display controller that displays, in a display screen of the display, an operation screen with a size set in accordance with the information obtained by the obtainer; and
a determiner that determines an operation instruction from the object based on at least one of a motion of the object and a shape thereof picked up by the camera.

The present invention is based on Japanese Patent Application No. 2011-100216 filed on Apr. 27, 2011. The whole specification, claims, and drawings of Japanese Patent Application No. 2011-100216 are herein incorporated in this specification by reference.

INDUSTRIAL APPLICABILITY

The present invention is suitably applicable to an input device, an input method and a recording medium which input data based on a gesture of a user.

REFERENCE SIGNS LIST

1 Obtainer
2 Display controller
3 Determiner
4 Executer
100 Input device
110 Operating device
120 Camera
130 Display
140 Main body
141 Image memory
142 Memory
143 Controller
142a Operation screen information
142b Command table
150 Sound outputter

What is claimed is:

1. An input device, comprising:
   an obtainer comprising one or more processors configured to obtain an image output by a camera, the image capturing a hand of an object, wherein the obtainer is configured to determine a distance between a display or the camera and the object by obtaining a ratio of an area of the hand within the image relative to an area of the whole image;
   a display controller comprising one or more processors configured to display, in a display screen of the display, an operation screen with a size set based on the ratio obtained by the obtainer, and to display a figure in the operation screen;
   a determiner comprising one or more processors configured to determine an operation instruction from the object based on at least one of a motion of the object picked up by the camera and a shape of the object picked up by the camera; and
   wherein the display controller is configured to change the figure in synchronization with the motion of the object picked up by the camera, and the figure comprises a plurality of arrows corresponding to moving directions of the hand of the object.

2. The input device of claim 1, wherein the display controller is configured to change the operation screen based on the at least one of the motion of the object picked up by the camera and the shape of the object picked up by the camera.

3. The input device of claim 1, wherein the determiner is configured to:
   determine a plurality of operation instructions based on a change in the at least one of the motion of the object picked up by the camera and the shape of the object picked up by the camera; and
   increase the number of the plurality of operation instructions as the distance indicated by the obtainer decreases.

4. The input device of claim 3, wherein the display controller is configured to increase the operation screen as the distance indicated by the obtainer increases.

5. The input device of claim 3, wherein the display controller is configured to change a figure displayed on the display and corresponding to the plurality of operation instructions as the determined distance becomes shorter.

6. The input device of claim 1, wherein:
   the obtainer is configured to obtain the information indicating the distance between the display and the hand of the object picked up by the camera; and
   the determiner is configured to determine the operation instruction from the object based on the motion of the hand of the object picked up by the camera.

7. The input device of claim 6, wherein the determiner is configured to determine the operation instruction from the object based on the shape of the hand of the object picked up by the camera and the motion of the hand of the object picked up by the camera.

8. The input device of claim 1, wherein the display controller is configured to change the color or tone of one of the plurality of arrows located in a portion of the operation screen corresponding to a moving direction of the hand of the object.

9. The input device of claim 1, wherein the figure further comprises a shape, and the display controller is configured to move the shape within the operation screen toward one of the plurality of arrows located in a portion of the operation screen corresponding to a moving direction of the hand of the object.

10. The input device of claim 1, wherein the determiner is configured to divide the operation screen into a first number of pieces when the determined distance is smaller than a predetermined threshold and to divide the operation screen into a second number of pieces when the determined distance is larger than a predetermined threshold, the second number of pieces being smaller than the first number of pieces, wherein each of the number of pieces corresponds to a recognized direction of motion of the hand of the object.

11. An input method, comprising:
    obtaining information indicating a distance between a display or a camera and an object picked up by the camera by obtaining a ratio of an area of an image of a hand of the object relative to an area of a whole image corresponding to image data output from the camera;
    displaying, in a display screen of the display, an operation screen with a size set based on the obtained information;
    displaying a figure in the operation screen;
    determining an operation instruction from the object based on at least one of a motion of the object picked up by the camera and a shape of the object picked up by the camera; and
    changing the figure in synchronization with the motion of the object.

12. The input method of claim 11, wherein the figure comprises a plurality of arrows corresponding to moving directions of the hand of the object.

13. The input method of claim 12, comprising changing the color or tone of one of the plurality of arrows located in a portion of the operation screen corresponding to a moving direction of the hand of the object.

14. The input method of claim 12, comprising moving a shape within the operation screen toward one of the plurality of arrows displayed in a portion of the operation screen corresponding to a moving direction of the hand of the object.

15. The input method of claim 11, comprising dividing the operation screen into a first number of pieces when the determined distance is smaller than a predetermined threshold and dividing the operation screen into a second number of pieces when the determined distance is larger than a predetermined threshold, the second number of pieces being smaller than the first number of pieces, wherein each of the number of pieces corresponds to a recognized direction of motion of the hand of the object.

16. A tangible, non-transitory machine-readable media comprising stored executable instructions that, when executed by a processor, cause the processor to:
- obtain an image output by a camera, the image capturing a hand of an object;
- determine a distance between a display or the camera and the object by obtaining a ratio of an area of an image of a hand of the object relative to an area of the whole image;
- display, in a display screen of the display, an operation screen with a size set based on the information obtained by the obtainer;
- display a figure in the operation screen;
- determine an operation instruction from the object based on at least one of a motion of the object picked up by the camera and a shape of the object picked up by the camera; and
- change the figure in synchronization with the motion of the object.

17. The tangible, non-transitory machine-readable media of claim 16, further comprising executable instructions that, when executed by the processor, cause the processor to display a figure in the operation screen and change the figure in synchronization with the motion of the object.

* * * * *